United States Patent
Blum et al.

(10) Patent No.: US 6,275,929 B1
(45) Date of Patent: Aug. 14, 2001

(54) DELAY-SLOT CONTROL MECHANISM FOR MICROPROCESSORS

(75) Inventors: Rivka Blum, Jerusalem; Meny Yanni, Tel Aviv, both of (IL)

(73) Assignee: Infineon Technologies AG 1. GR., Munich (DE)

(*) Notice: Subject to any disclaimer, the term of this patent is extended or adjusted under 35 U.S.C. 154(b) by 0 days.

(21) Appl. No.: 09/318,631

(22) Filed: May 26, 1999

(51) Int. Cl.$^7$ ................ G06F 9/38; G06F 9/22; G06F 1/04
(52) U.S. Cl. ............ 712/219; 712/244; 712/227; 712/245; 713/502
(58) Field of Search .............. 712/242, 23, 222, 712/243, 223, 234, 228, 248, 245, 22, 227, 221, 207, 13, 231, 219, 217, 216; 713/244, 401, 502

(56) References Cited

U.S. PATENT DOCUMENTS 5,638,524 * 6/1997 Kiuchi et al. .................. 712/221
5,964,867 * 10/1999 Anderson et al. ............. 712/219

* cited by examiner

Primary Examiner—Daniel H. Pan
(74) Attorney, Agent, or Firm—Mark M. Friedman

(57) ABSTRACT

A method for insertion of a dynamic number of implicit nop instructions by the microprocessor at run-time. The implicit nop instructor is a no operation instruction which is executed by the microprocessor without placing an actual nop instruction in the program itself. The method of the present invention enables the appropriate number of implicit nop instructions to be automatically calculated and executed for every occurrence of a multi-cycle instruction. Hereinafter, the term automatically refers to a process which occurs without the direct intervention of the programmer or higher-language compiler. The appropriate number of implicit nop instructions is automatically calculated by the microprocessor, by subtracting the number of IDSI from the total number of delay-slots which are required. The number of IDSI is preferably determined by the assembler, and then made available to the microprocessor. More preferably, this number is placed in a delay-slot field in the coded instruction by the assembler, and is then retrieved from the delay-slot field by the microprocessor. Thus, the method of the present invention enables the microprocessor to automatically insert the required number of implicit nop instructions, without requiring extra memory resources and without forcing the programmer or higher-language compiler to insert nop instructions into each unused delay-slot.

8 Claims, 4 Drawing Sheets

Figure 5B

Main Program　　　　　　　　Routine　　　　　　　／ 36　　　／ 32
　　　　　　　　　　　　　　　　　　　　　／ 34 instruction ;　／ 38
instruction ;　── 38
instruction ;　／ 38
instruction ;　──── 38
call routine_name
{
inserted inst. ;　──────── 44
} instruction ;　／ 38
　　　　　　　　　　　　instruction ;　── 38
　　　　42　──── return
　　　　　　　　　　　　{
　　　　　　　　　　　　inserted inst. ;　──────── 44
　　　　　　　　　　　　inserted inst. ;
　　　　　　　　　　　　}　　　　　　　　── 44
instruction ;──────── 38
instruction ;──
instruction ;────── 38
instruction ;──── 38
instruction ;
　　　　　　　　　　　　── 38
　　　　　　　　　　　　── 38

DELAY-SLOT CONTROL MECHANISM FOR MICROPROCESSORS

FIELD AND BACKGROUND OF THE INVENTION

The invention is of a method for inserting a flexible number of useful instructions into delay slots and, in particular, for a method of automatically and dynamically determining the number of additional nop (no operation) instructions to be inserted into delay slots for the execution of a multi-cycle instruction, substantially without placing actual nop instructions into the program itself, yet while permitting useful instructions to be placed into the delay slots. The method of the present invention reduces the amount of space in memory required to store the program, as well as saving power consumption since the number of fetch operations is reduced. These benefits are achieved while still enabling the delay slots to be used.

Microprocessors were introduced around twenty-five years ago and have proliferated rapidly throughout many different types of technology. Advances of real-time microprocessor technology, especially in the communications industry, have boosted mass production of sophisticated devices such as cellular telephones, answering machines and audio systems. More efficient methods for production of these devices are continuously being sought, in order to increase the performance of the technology while reducing the costs of development and production.

Microprocessors execute machine code instructions which are derived from program code written by a human programmer or a code generator. Most of the instructions of current microprocessors are executed within a single clock cycle. Some instructions, however, require more than one clock cycle for execution and are termed multi-cycle instructions. Typical multi-cycle instructions include conditional branch instructions and other program-flow instructions. The clock cycles which elapse before a multi-cycle instruction takes effect are wasted. These cycle clocks are called delay-slots.

FIG. 1 illustrates an instruction sequence 10 of a background art program which demonstrates the time wasted by the insertion of three required empty cycles 12 for a multi-cycle instruction 14. Each empty cycle 12 does not result in the performance of a single-cycle instruction 16, but is inserted only to permit multi-cycle instruction 14 to be performed. Clearly, instruction sequence 10 represents a relatively inefficient method for enabling multi-cycle instruction 14 to be performed.

Pipeline architecture for microprocessors was developed to execute more instructions in parallel for greater efficiency. Pipeline microprocessors are capable of running a few instructions simultaneously, such that the microprocessor is not idle during the vacant time-slots. Other instruction can be inserted into the delay-slots by the human programmer in order to use the previously wasted time required for execution of the multi-cycle instruction. The microprocessors fetches these delay-slot instructions individually during the delay-slots, loads these instructions into the pipe and then executes the instructions simultaneously. These inserted instructions are usually not related to the multi-cycle instruction for which the delay-slots were originally generated. Instead, these instructions perform other tasks such as control duties, registration of loading for the following instructions and so forth.

FIG. 2 illustrates the program of FIG. 1, rewritten to be performed by a microprocessor having a pipelined architecture according to the background art. Now an instruction sequence 18 of the program features three instructions 20 to be executed in cycles 4,5 and 6 during delay-slots for multi-cycle instruction 14. Thus, the program of FIG. 2 is executed more efficiently than that of FIG. 1.

However, currently the pipelined microprocessor architecture has a number of disadvantages. For example, both time and memory space which holds the program are wasted by multi-cycle instructions if useful instructions are not inserted into the delay slots. If only some, but not all, delay-slots are filled by useful instructions, the unused delay-slots currently must be loaded with nop (no operation) instructions. Nop instructions require memory space but do not perform any useful function. Since such nop instructions are frequently required, the delay-slot problem is merely reduced but not solved. Thus, there is a tradeoff between the requirement for additional memory space and the amount of time which is wasted.

In addition to the problems of wasted time and memory space, the requirements of the programmer must also be considered. The programmer should fill as many delay-slots as possible with useful instructions, in order to optimize performance, but finding useful instructions is rarely simple. The process of inserting useful instructions into all of the delay-slots is time consuming, difficult to document and difficult to maintain. Programmers spend a good deal of time seeking useful instructions to place in the delay-slots. Furthermore, higher-language compilers such as C compilers must also attempt to fill delay slots with useful instructions. Even with an optimization algorithm, such compilers often cannot use all delay slots, thereby wasting additional space required to store the program.

Program-flow instructions are an example of such multi-cycle instructions and occur, on average, at a rate of 1 program-flow instruction for every 18 single-cycle instructions in typical communication applications. This rate can be used to calculate the expected amount of wasted memory, knowing that an average program-flow instruction generates three required nop instructions, according to Equation 1 below:

$$\text{Wasted memory (Kb)} = 3 * \frac{totalprogram \text{ (Kb)}}{18}$$

Equation 1 shows that a program which is 18 Kb in size, for example, is wasting 3 Kb of memory, not including memory wasted by the other types of multiple-cycle instructions. Such memory wastage reduces the efficiency of operation of the associated device, as well as increasing costs of production. Thus, multi-cycle instructions cause a three-way problem, including wasting time and program memory, and increasing the amount of time required by a programmer in an attempt to use the delay slots for instructions.

The relatively high rate at which multi-cycle instructions occur has highlighted the shortcomings of the pipelined microprocessor architecture. Currently, two different methods for handling multi-cycle instructions are available in the background art. The first method involves not using any delay-slots, thereby wasting time but saving memory, since the microprocessors can run nop instructions without having them explicitly included in the program. The second method requires all of the delay-slots to be used by inserting either an actual instruction or a nop instruction. The memory space required is increased if nop instructions are inserted. However, if the actual instructions are efficiently inserted, the amount of time required to execute the program is reduced.

The first background art method is selected when high performance of the execution of the program (with regard to time) is not required. The performance of the execution of the program, and hence the amount of time required for the program to be executed, is traded for memory economy and ease of programming by the programmer. The second background art method is designed for high performance applications which must be executed efficiently. Programmers who are interested in rapid, efficient execution of a program must therefore insert useful instructions into all the delay-slots. This is a tedious task which may gain performance efficiency and therefore reduce the amount of time required to execute the program if all delay slots are used, but causes a penalty of an expanded amount of memory required to store the program if not all delay slots are usefully used. A failure to use all of the delay-slots causes nop instructions to be inserted into all of the remaining unused delay-slots. Thus, neither background art method for handling multi-cycle instructions provides all the three advantages: speed, economical and efficient use of memory, and ease of programming.

There is thus a need for, and it would be useful to have, a method for more efficiently handling delay slots by having only useful instructions explicitly inserted into delay slots by the human programmer or higher language compiler, such that implicit nop instructions are inserted to complete the number of delay slots remaining in a substantially automatic process during operation of the microprocessor and such that memory space associated with the microprocessor is used more efficiently, while improving performance and reducing development time and costs, and while providing an optimal balance between the requirement for additional memory space to hold such useful instructions and the amount of time which is wasted during program execution by such implicit nop instructions.

SUMMARY OF THE INVENTION

The present invention is of a method for insertion of a dynamic number of implicit nop instructions by the microprocessors at run-time. The implicit nop instruction is a no operation instruction which is executed by the microprocessor without placing an actual nop instruction in the program itself. The method of the present invention enables the appropriate number of implicit nop instructions to be automatically calculated and executed for every occurrence of a multi-cycle instruction. Hereinafter, the term automatically refers to a process which occurs without the direct intervention of the programmer or code generator. The appropriate number of implicit nop instructions is automatically calculated by the microprocessor, by subtracting the number of inserted delay-slot instructions (IDSI) from the total number of delay-slots which are required.

The method of the present invention has the advantage of reducing the amount of space in memory required to store the program, as well as saving power consumption since the number of fetch operations is reduced. Furthermore, the present invention provides an optimal balance between the requirement for additional memory space to hold such useful instructions and the amount of time which is wasted during program execution, as well as a balance between the insertion of nop instructions and the additional time required for the human programmer to insert useful delay slot instructions. The number of inserted delay-slot instructions is preferably counted by the assembler, and is then made available to the microprocessor. More preferably, this number is placed in a delay-slot field in the coded instruction by the assembler, and is then retrieved from the delay-slot field by the microprocessor. Thus, the method of the present invention enables the microprocessor to automatically insert the required number of implicit nop instructions to fill cycles required for the multi-cycle instruction to take effect, without requiring extra memory resources and without forcing the programmer or code generator, such as a higher-language compiler, to insert nop instructions into each unused delay-slot, in contrast to background art FIG. 1. Inserted delay-slot instructions (IDSI) for the multi-cycle instruction are useful instructions in the sense that they are not nop instructions, implicit or otherwise.

According to the present invention, there is provided a method for automatically inserting a required number of nop (no operation) instructions by a microprocessor during execution of a plurality of instructions, the plurality of instructions including at least one multi-cycle instruction, a total number of delay slots being required for the at least one multi-cycle instruction, the method comprising the steps of: (a) determining a number of inserted delay-slot instructions (IDSI) associated with the at least one multi-cycle instruction; (b) calculating the required number of nop instructions by subtracting the number of IDSI from the total number of delay slots by the microprocessor; and (c) executing the required number of nop instructions by the microprocessor.

Preferably, the total number of delay slots required for the at least one multi-cycle instruction is hardware dependent. Also preferably, the method further comprises the step of providing an assembler for receiving the plurality of instructions and for preparing the plurality of instructions for execution by the microprocessor, the step of providing the assembler being performed before step (a) is performed, and wherein step (a) further comprises the steps of: (i) counting the number of IDSI by the assembler; and (ii) communicating the number of IDSI to the microprocessor. More preferably, the step of communicating the number of IDSI to the microprocessor further comprises the steps of: (I) providing a delay slot field in the at least one multi-cycle instruction; (II) placing the number of IDSI in the delay-slot field by the assembler; and (III) retrieving the number of IDSI from the delay-slot field by the microprocessor.

According to another embodiment of the present invention, there is provided a method for automatically inserting a required number of nop instructions by a microprocessor during execution of a plurality of instructions, the plurality of instructions including at least one multi-cycle instruction, the method comprising the steps of: (a) providing an assembler for receiving the plurality of instructions; (b) providing, to the microprocessor, a total number of delay slots required for the at least one multi-cycle instruction, (c) determining a number of IDSI associated with the at least one multi-cycle instruction by the assembler; (d) communication the number of IDSI to the microprocessor; (e) calculating the required number of nop instructions by subtracting the number of IDSI from the total number of delay slots by the microprocessor; and (f) executing the required number of nop instructions by the microprocessor. Hereinafter, the term higher-language compiler refers to a compiler for a programming language, such as C or C++ for example, which is at a higher level than the assembly programming language.

BRIEF DESCRIPTION OF THE DRAWINGS

The foregoing and other objects, aspects and advantages will be better understood from the following detailed description of a preferred embodiment of the invention with reference to the drawings, wherein:

FIG. 5A is a flowchart of the exemplary method for inserting nop delay slots according to the present invention, while FIG. 5B is a representation of a portion of an exemplary program structured according to the method shown in FIG. 5A.

DETAILED DESCRIPTION OF THE INVENTION

The present invention is of a method for insertion of a dynamic number of implicit nop instructions by the microprocessor at run-time. The implicit nop instruction is a no operation instruction which is executed by the microprocessor without placing an actual nop instruction in the program itself. The method of the present invention enables the appropriate number of implicit nop instructions to be automatically calculated and executed for every occurrence of a multi-cycle instruction. Hereinafter, the term automatically refers to a process which occurs without the direct intervention of the programmer or the higher-language compiler. The appropriate number of implicit nop instructions is automatically calculated by the microprocessor, by subtracting the number of inserted delay-slot instructions (IDSI) from the total number of delay-slots which are required.

The number of IDSI is preferably counted by the assembler, and is then made available to the microprocessor. More preferably, this number is placed in a delay-slot field in the coded instruction by the assembler, and is then retrieved from the delay-slot field by the microprocessor. Thus, the method of the present invention enables the microprocessor to automatically insert the required number of implicit nop instructions, without requiring extra memory resources and without forcing the programmer or higher-language compiler to insert nop instructions into each unused delay-slot.

The principles and operation of a method for efficient delay-slot usage according to the present invention may be better understood with reference to the drawings and the accompanying description, it being understood that these drawings are given for illustrative purposes only and not meant to be limiting.

Figure 1:
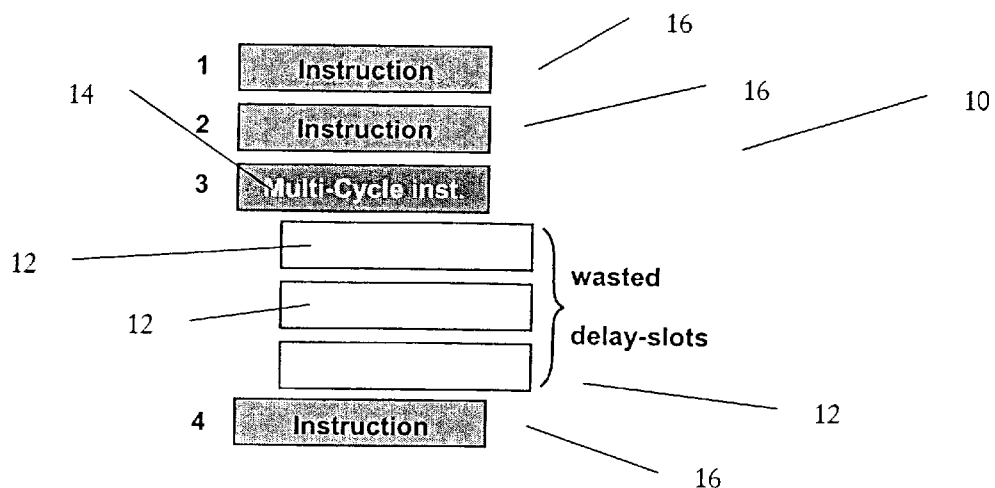
FIG. 1 is a schematic block diagram of a first illustrative background art method for handling multi-cycle instructions, without delay slots.
Figure 2:
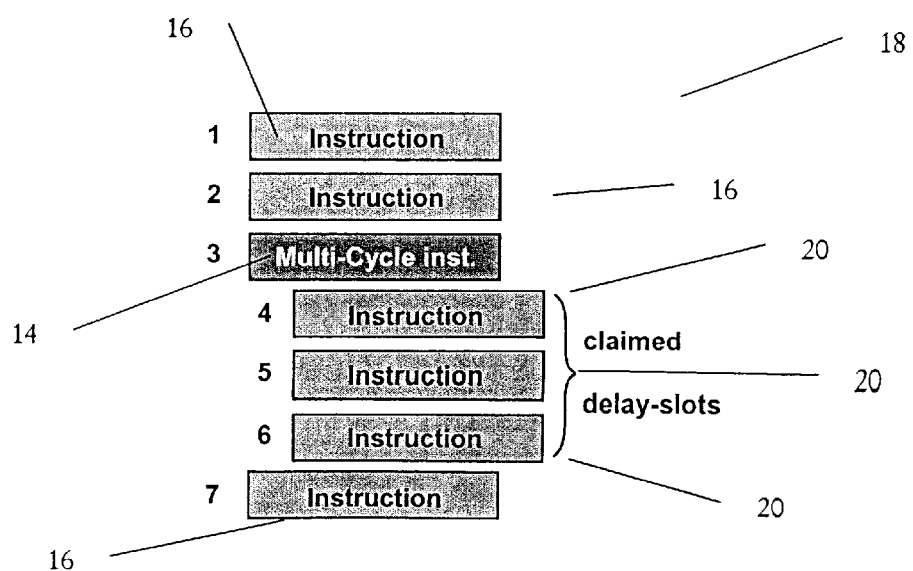
FIG. 2 is a schematic block diagram of a second illustrative background art method for handling multi-cycle instructions, with delay slots.
Figure 3:
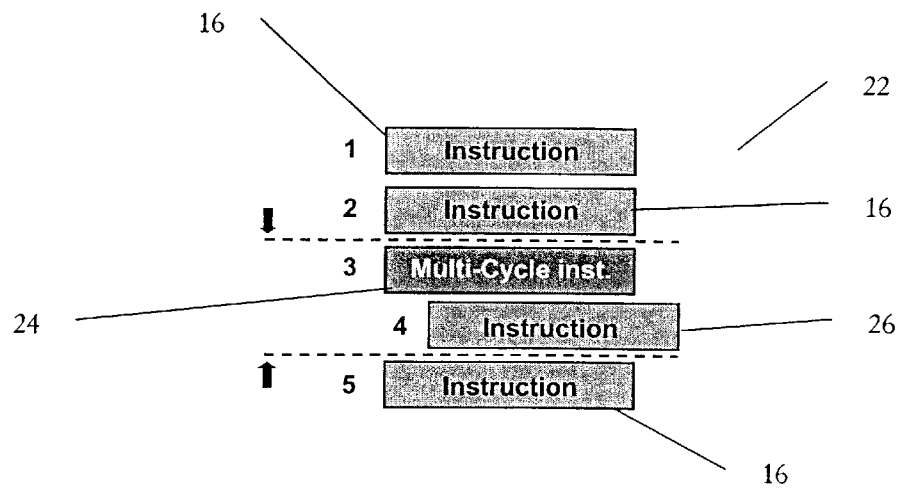
FIG. 3 is a schematic block diagram of an illustrative method for efficient delay-slot usage according to the present invention.

Referring now to the drawings, FIG. 3 is a schematic block diagram of an illustrative method for efficient delay-slot usage according to the present invention. As shown, an illustrative instruction sequence 22, representing at least a portion of a program, features a multi-cycle instruction 24. Instruction sequence 22 features only one inserted delay-slot instruction (IDSI) 26 which is executed during a delay slot of multi-cycle instruction 24. The remaining delay-slots are filled with a dynamic number of implicit nop instructions. An implicit nop instruction is a nop instruction which is not placed in the program, such that unused delay-slots do not require the insertion of nop instructions into the memory. The number of implicit nop instructions dynamically changes to equal the number of unused delay-slots. Thus, the human programmer or higher-language compiler is not compelled to fill all of the delay-slots with either IDSI or with nop instructions.

The advantages of inserting a dynamic number of implicit nop instructions include the ability to insert only as many useful delay-slot instructions as desired, thereby minimizing wasted cycles while reducing the amount of memory required for the program. In addition, the human programmer is able to program and debug the instructions much more rapidly and efficiently, since there is only partial usage of delay-slots with useful delay slot instructions, thereby decreasing the amount of development time and of man-hours required to develop a particular product.

Figure 4:
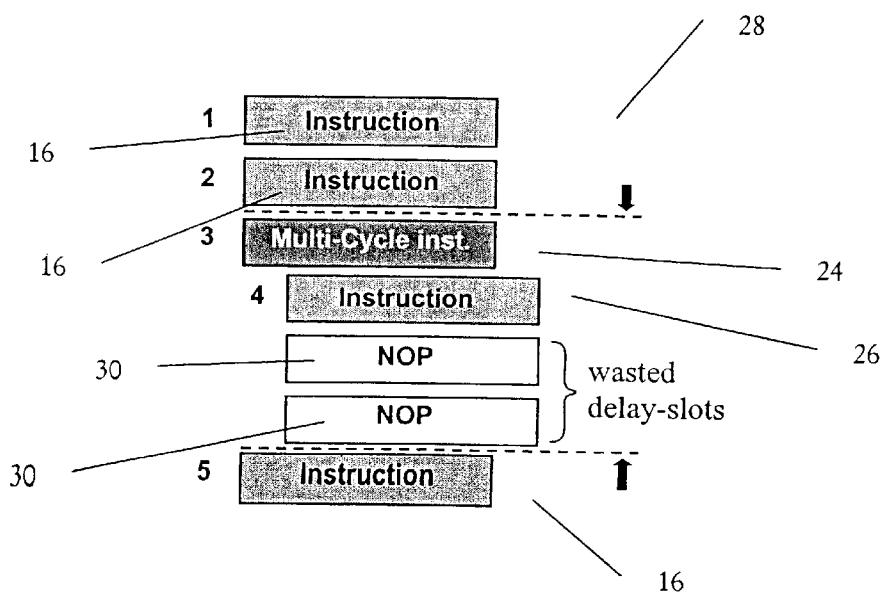
FIG. 4 is a schematic block diagram of a less efficient background art method for performing the instructions of FIG. 3, through an architecture which is similar to the architecture shown in FIG. 2, although all delay slots are not used.

By contrast, currently available background art methods for performing such multi-cycle instructions are significantly less efficient. For example, FIG. 4 is a schematic block diagram according to the background art, showing the instructions of FIG. 3, but without implementing the method of the present invention. As shown, an illustrative instruction sequence 28 again features multi-cycle instruction 24 and one delay-slot instruction 26. However, the background art method requires the insertion of two nop instructions 30 in order to fill a predetermined number of delay-slots for multiple-cycle instruction 24, thereby wasting two delay-slots. Thus, clearly the background art method of FIG. 4 is less efficient than the method of the present invention.

Figure 5A:
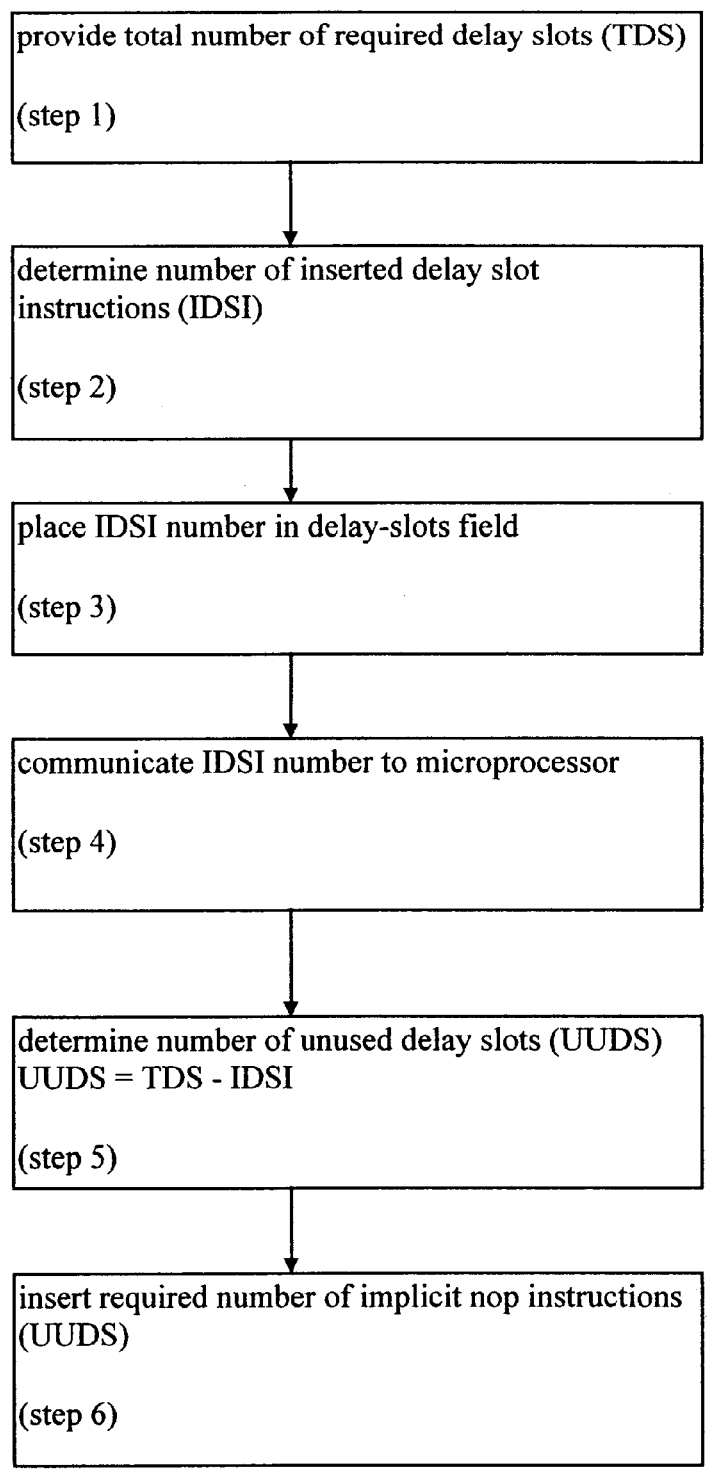

FIG. 5A is a flowchart illustrating an example of the method of the present invention for operation by a microprocessor. In order for the microprocessor to execute a multi-cycle instruction, the microprocessor must insert either a delay-slot instruction or else a nop instruction for every delay-slot. For the present invention, the nop instructions are a dynamically determined number of implicit nop instructions, determined according to the method shown in FIG. 5A.

Briefly, the total number of required delay-slots (TDS) for a multi-cycle instruction is available to the microprocessor, as shown in step 1. The total number of required delay-slots is hardware-dependent. In step 2, the assembler determines the number of inserted delay-slot instructions (IDSI) for the multi-cycle instruction. These are useful instructions in the sense that they are not nop instructions, implicit or otherwise. The purpose of implicit nop instructions is to fill time which is not being used for IDSI while the multi-cycle instruction executes.

Preferably, the assembler determines the number of inserted delay-slot instructions (the IDSI number) by counting each inserted useful delay-slot instruction for the multi-cycle instruction.

In step 3, preferably the assembler places the IDSI number (number of used delay slots) in a delay-slot field of the coded multi-cycle instruction. The delay-slot field of the instruction is a preferred, additional field for storing the IDSI number, and is typically (although not necessarily) 2–3 bits long.

In step 4, the IDSI number for the multi-cycle instruction is given to the microprocessor by the assembler. Preferably, the microprocessor obtains the IDSI number by examining the delay-slot field of the coded instruction during run-time to calculate the number of required implicit nop instructions (the UUDS number, which is the number of unused delay slots).

In step 5, the microprocessor calculates the UUDS number by subtracting the IDSI number (the number of inserted delay-slot instructions) form the TDS number (the total number of required delay-slots) as shown in Equation 2:

$$UUD=TDS-IDSI$$

In step 6, the microprocessor inserts the required number of implicit nop instructions during the execution of the multi-cycle instruction.

An example of the operation of the method of FIG. 5A is described with regard to FIG. 5B. FIG. 5B shows a portion of a program 32, with a main program 34 and a routine 36. A plurality of single-slot instructions 38 is also shown. A call instruction 40 is shown, which involves routine 36 (a secondary program) with the name routine_name. The operation of routine 36 is terminated by the return instruction 42. For example, call instruction 40, which stores the current environment before branching, requires four clock-cycles before call instruction 40 takes effect. One clock-cycle is required for the code of call instruction 40, and three clock-cycles are required for three delay-slots. Return instruction 42, which must restore the environment before main-program 34 resumes control, requires, for example, six clock-cycles. One clock-cycle is required for the code of return instruction 42, and five clock-cycles are required for five delay-slots. Thus, call instruction 40 and return instruction 42 are both multi-cycle instructions.

In order to calculate the number of required implicit nop instructions for the operation of call instruction 40 and return instruction 42, the microprocessor should know the number of delay-slot instructions which have been inserted into delay slots for each occurrence of the multi-cycle instruction. As described with regard to FIG. 5A, the microprocessor retrieves this number from the delay-slot field of the coded instruction.

In this example, a single useful delay-slot instruction (IDSI) 44 has been inserted for call instruction 40 by the programmer, out of the three required delay-slots. Two useful delay-slot instructions 44 have been inserted for return instruction 42 out of the five required delay-slots.

During the process of compiling the program 32, the assembler counts the number of inserted delay-slot instructions 44 for call instruction 40, which in this example is the number 1. Therefore, the assembler loads the number 1 into the delay-slot field of call instruction 40. This information is loaded into memory for communication with the microprocessor during execution. Since three delay-slots are required, the microprocessor executes two implicit nop instructions, as described with regard to FIG. 5A.

Similarly, the assembler also counts the number of inserted delay-slot instructions 44 for return instruction 42, which in this example is the number 2. Therefore, the assembler loads the number 2 into the delay-slot field of return instruction 42. Since five delay-slots are required, the microprocessor executes three implicit nop instructions, again as described with regard to FIG. 5A.

Thus, the method for the delay-slot control mechanism of the present invention has the following advantages. First, the method of the present invention optimizes the tradeoff between the performance of the program and the amount of memory space required for the program. Instead, the present invention provides an optimal balance between the requirement for additional memory space to hold such useful instructions and the amount of time which is wasted during program execution, as well as a balance between the insertion of nop instructions and the additional time required for the human programmer to insert useful delay slot instructions.

Second, the method of the present invention avoids the penalty of requiring the human programmer, higher-language compiler or other automatic machine language code programming tool, to insert a nop instruction for every delay-slot which does not contain a useful delay-slot instruction, such that the programmer can insert useful delay-slot instructions only as necessary for the program. Thus, the balance is maintained between avoiding the penalty for not filling all delay slots with IDSI and yet still receiving the benefits for using at least a portion of the available delay slots for IDSI.

It will be appreciated that the above description are intended only to serve as examples, and that many other embodiments are possible within the spirit and scope of the present invention.

What is claimed is:

1. A method for automatically inserting a required number of nop (no operation) instructions by a microprocessor during execution of a plurality of instructions, the plurality of instructions including at least one multi-cycle instruction, a total number of delay slots being required for the at least one multi-cycle instruction, the method comprising the steps of:
    (a) determining a number of inserted delay-slot instructions (IDSI) associated with the at least one multi-cycle instruction;
    (b) calculating the required number of nop instructions by subtracting said number of IDSI from the total number of delay slots by the microprocessor; and
    (c) executing the required number of nop instructions by the microprocessor.

2. The method of claim 1, wherein the total number of delay slots required for the at least one multi-cycle instruction is hardware dependent.

3. The method of claim 1, further comprising the step of providing an assembler for receiving the plurality of instructions and for preparing the plurality of instructions for execution by the microprocessor, the step of providing said assembler being performed before step (a) is performed, and wherein step (a) further comprises the steps of:
    (i) counting said number of IDSI by said assembler; and
    (ii) communication said number of IDSI to the microprocessor.

4. The method of claim 3, wherein the step of communication said number of IDSI to the microprocessor further comprises the steps of:
    (I) providing a delay-slot field in the at least one multi-cycle instruction;
    (II) placing said number of IDSI in said delay-slot field by said assembler; and
    (III) retrieving said number of IDSI from said delay-slot field by the microprocessor.

5. A method for automatically inserting a required number of nop instructions by a microprocessor during execution of a plurality of instructions, the plurality of instructions including at least one multi-cycle instruction, the method comprising the steps of:
    (a) providing an assembler for receiving the plurality of instructions;
    (b) providing, to the microprocessor, a total number of delay slots required for the at least one multi-cycle instruction;
    (c) determining a number of IDSI associated with the at least one multi-cycle instruction by said assembler;
    (d) communicating said number of IDSI to the microprocessor;

(e) calculating the required number of nop instructions by subtracting said number of IDSI from said total number of delay slots by the microprocessor; and (f) executing the required number of nop instructions by the microprocessor.

6. The method of claim 5, wherein the total number of delay slots required for the at least one multi-cycle instruction is hardware dependent.

7. The method of claim 5, wherein step (a) further comprises the step of:

(i) counting said number of IDSI by said assembler.

8. The method of claim 7, wherein the step of communicating said number of IDSI to the microprocessor further comprises the steps of:

(i) providing a delay-slot field in the at least one multi-cycle instruction;

(ii) placing said number of IDSI in said delay-slot field by said assembler; and (iii) retrieving said number of IDSI from said delay-slot field by the microprocessor.

* * * * *